3,703,521
METHOD FOR THE PREPARATION OF STABLE 4-FLUOROPYRIDINE SALTS

Max M. Boudakian, Pittsford, N.Y., assignor to Olin Corporation
No Drawing. Filed Mar. 22, 1971, Ser. No. 127,039
Int. Cl. C07d 31/26
U.S. Cl. 260—290 HL      9 Claims

ABSTRACT OF THE DISCLOSURE

This invention relates to a novel integrated route to selected stable salt adducts of 4-fluoropyridine and substituted 4-fluoropyridines in high yield by the diazotization and fluorination of selected 4-aminopyridines to form the respective 4-fluoropyridine followed by combination with the desired stabilizer in an organic medium to form the respective 4-fluoropyridine salt.

---

This invention relates to an integrated route to selected stable salts of 4-fluoropyridine and substituted 4-fluoropyridines in surprisingly high yield.

Generally, past attempts to prepare 4-fluoropyridine have not been very successful due primarily to the extreme instability of such compound. One attempt to prepare 4-fluoropyridine was based on the diazotization and fluorination of 4-aminopyridine in aqueous hydrofluoric acid followed by distillation. The unstable product was obtained in the impure state in only trace quantities and additionally spontaneously polymerized (J. P. Wibaut et al., Bull. Soc. Chim., France, p. 424 (1958); Chemical Abstracts, 52, 2151 (1958)). Another attempt to obtain 4-fluoropyridine was made using the classical Schiemann route based on the precipitation of pyridinediazonium fluoborates, followed by pyrolysis of the latter. This method resulted in a 34–50% yield of 2- and 3-fluoropyridine from the corresponding 2- and 3-aminopyridine. However, attempts to prepare 4-fluoropyridine using this method were unsuccessful because of the instability of both 4-pyridinediazonium fluoborate and 4-fluoropyridine (A. Roe et al., J. Am. Chem. Soc., 69, p. 2443 (1947)). An additional attempt to prepare 4-fluoropyridine by exchange fluorination based on the reaction of 4-chloropyridine with potassium fluoride in dimethyl formamide was unsuccessful in that no product could be isolated (K. Thomas et al. in "Newer Methods of Preparative Organic Chemisty," edited by W. Foerst, pp. 73–76, 1964).

A method for preparing the 4-bromopyridine and the hydrochloride salt thereof was disclosed in an article by A. Murray III et al., in J. Am. Chem. Soc., 74, pp. 6289 and 6290 (1952). This method involved the Craig modification for the diazotization-bromination (with hydrobromic acid-bromine) of 4-aminopyridine followed by the Wibaut et al. method of isolation (see article noted above). However, this method cannot be used in the preparation of fluoropyridine because if fluorine (instead of bromine) is used, a hazardous uncontrollable reaction results. For example, while fluorine and pyridine react in trichlorofluoromethane solvent at —80° C. to give a solid adduct, violent decomposition occurs when this is heated above —2° C. (Meinert, Z. Chem., 5, 64, 1965). Additionally, the steam distillation involved in the Murray method could not be used since it would result in immediate decomposition of 4-fluoropyridine because of its thermal instability and as demonstrated by Wibaut (noted above), the distillation of 4-fluoropyridine at a lower temperature (24.25° C./20 min.) was also unsatisfactory because a considerable amount of impure product resulted due to the fact that 4-fluoropyridine is unstable even at room temperature. Wibaut (see above) also noted that 4-fluoropyridine was the least stable of the 4-halopyridines (order of instability): 4-fluoropyridine>4-bromopyridine>4-chloropyridine>4-iodopyridine.

The Roe et al. article (noted above) which described the unsuccessful attempt to isolate 4-fluoropyridine using the Schiemann route, also described an attempt to isolate the hydrochloride of 4-fluoropyridine. However, due to the high instability of 4-pyridinediazonium fluoborate and the apparent formation of N-(4'-pyridyl)-4-pyridone, the product obtained was very impure indicating at best an extremely low yield and furthermore, the composition of the product obtained was not ascertained.

Now it has been found that, following the diazotization of 4-aminopyridine in hydrofluoric acid and subsequent decomposition to generate 4-fluoropyridine, the latter can be successfully isolated from the highly acidic fluorination mixture by neutralization in the presence of an inert organic solvent, followed by addition of a selected stabilizer to the organic medium to form a desired stable salt of 4-fluoropyridine in high yield. Such transformations to form stable adducts are illustrated by the following equation:

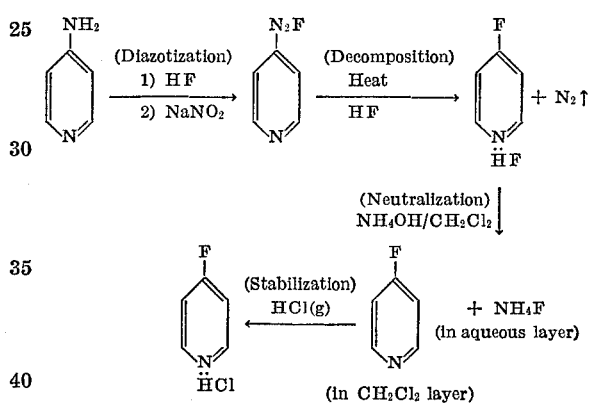

The formation of a 4-fluoropyridine salt is particularly desirable since it permits indefinite storage of 4-fluoropyridine as a stable adduct under ambient conditions. In contrast, 4-fluoropyridine is highly unstable and self-condenses at room temperature. 4-fluoropyridine or the substituted 4-fluoropyridine can be readily generated from these salts for use in a chemical reaction by addition of such salts to a mixture of an alkaline or basic solution, e.g. an aqueous solution of alkali and alkaline earth metal hydroxides, oxides, carbonates and salts and an inert organic solvent such as those described infra. The liberated 4-fluoropyridine compound is dissolved in the organic layer and can be recovered in a medium suitable for use by phasing the organic layer and drying over a drying agent. This procedure is illustrated as follows: (a) addition of 4-fluoropyridine hydrochloride to a mixture of aqueous ammonium hydroxide and methylene chloride, (b) liberated 4-fluoropyridine from this neutralization is dissolved in the organic layer and can be recovered by (c) phasing of the organic layer and subsequent drying over a desiccant (silica gel) to provide 4-fluoropyridine in a medium suitable for desired chemical reaction.

The selected 4-fluoropyridine salts of this invention and the 4-fluoropyridines obtained therefrom have particular utility as nematocidal agents and the 4-fluoropyridine derived from the salts can be converted to the polymer which has a desirably high electrical conductivity (A. A. Berlin et al., J. Polymer Science, Part C, No. 16, 369 (1967)).

The starting materials for this invention may include a wide variety of 4-aminopyridines and more particularly, the 4-aminopyridines having the following formula:

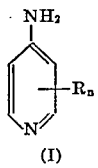

(I)

wherein each R is independently selected from the following groups: alkyl and more particularly lower alkyl of 1 to 4 carbon atoms, e.g. methyl, propyl and butyl; alkoxy and more particularly alkoxy having 1 to 4 carbon atoms, e.g. methoxy, ethoxy and butoxy; nitro; and halogen, e.g. chlorine, bromine, fluorine and iodine and $n$ is an integer of 0 to 4.

Illustrative of such starting materials are the following:

4-amino-2-picoline
4-amino-3-picoline
4-amino-2,6-lutidine
4-amino-2-methyl-5-ethylpyridine
4-amino-2-ethylpyridine
4-amino-3,5-lutidine
4-amino-2-methoxypyridine
4-amino-2-ethoxypyridine
4-amino-3-nitropyridine
4-amino-3,5-dinitropyridine
4-amino-3-bromo-5-nitropyridine
4-amino-2-chloropyridine
4-amino-3-chloropyridine
4-amino-2,5-dichloropyridine
4-amino-2,6-dichloropyridine
4-amino-3,5-dichloropyridine
4-amino-2,3,6-trichloropyridine
4-amino-2,3,5,6-tetrachloropyridine
4-amino-2-bromopyridine
4-amino-3-bromopyridine
4-amino-2,3-dibromopyridine
4-amino-2,5-dibromopyridine
4-amino-2,6-dibromopyridine
4-amino-3,5-dibromopyridine
4-amino-2,3,5-tribromopyridine
4-amino-2,3,6-tribromopyridine
4-amino-2,3,5,6-tetrabromopyridine
4-amino-2-fluoropyridine
4-amino-3-fluoropyridine
4-amino-2,3,5,6-tetrafluoropyridine
4-amino-2-iodopyridine
4-amino-3-iodopyridine
4-amino-3,5-diiodopyridine
4-amino-2,3-dichloro-5-bromopyridine
4-amino-2-chloro-5-bromopyridine
4-amino-2,5-dibromo-3-chloropyridine
4-amino-3-fluoro-2,6-lutidine
4-amino-3-bromo-2,6-lutidine
4-amino-3,5-dibromo-2,6-lutidine
4-amino-3-iodo-2,6-lutidine
4-amino-3,5-diiodo-2,6-lutidine
4-amino-5-chloro-2,3,6-trifluoropyridine
4-amino-3,5-dichloro-2,6-difluoropyridine Further illustrations of compounds having the above designated Formula I are disclosed in "Chemistry of Heterocyclic Compounds" edited by Arnold Weissburger, Part III, Chapter 9, Aminopyridines, Andrew S. Tomcufcik and L. N. Starker, 1962, Interscience Publishers, N.Y.

The compound used to form the stable adduct of 4-fluoropyridine may be selected from a wide variety of inorganic and organic sub-classes, e.g. salts from inorganic and organic acids, complexes with metal halides, quaternary salts derived from alkyl halides and adducts with halogens or interhalogens. More particularly, the compound used will be a mineral acid and preferably a mineral acid selected from the group consisting of HCl, HBr and $H_2SO_4$. Such compound may be in gaseous or liquid form with gaseous HCl and HBr and liquid $H_2SO_4$ (100% concentration) being preferred.

The neutralization agent used may be any alkaline or basic material such as alkali and alkaline earth metal hydroxides, oxides, carbonates and other salts. Illustrative of the many known base materials which may be used are the following compounds: ammonium hydroxide, sodium hydroxide, potassium hydroxide, calcium hydroxide, sodium carbonate and ammonia. The amount of base material used will vary widely and must generally be sufficient to neutralize the solution to a pH of about 7 to about 12.

A wide variety of inert organic solvents which will not interact with selected acid or salt can be used in the method of this invention. More particularly, the organic solvent used can be an aliphatic or cyclic hydrocarbon having up to 8 carbon atoms, an aromatic hydrocarbon having up to 10 carbon atoms and halogenated derivatives thereof. Also useful are aliphatic ethers and alcohols having up to 8 carbon atoms. Illustrative of the above compounds are the following: hexane, octane, methylene chloride, chloroform, carbon tetrachloride, trifluorotrichloroethane, cyclohexane, methylcyclohexane, benzene, toluene, xylene, chlorobenzene, benzotrifluoride, n-butyl ether, ethanol and n-butyl alcohol. Further illustrations of the useful solvents may be found in Organic Solvents edited by Weissburger et al., vol. VII, 2nd edition, 1955.

The solvents noted above may be used during neutralization and subsequent reaction with the selected acid or salt and alternatively, these solvents may additionally be present during diazotization and fluorination.

Following neutralization, the organic solvent may be dried by using well-known drying agents and desiccants, such as silica gel, sodium sulfate, calcium chloride, magnesium sulfate and Drierite (special form of anhydrous calcium sulfate). Alternately, the organic solvent may be dried by partial concentration under reduced pressure.

In carrying out the method of this invention, generally a molar ratio of hydrogen fluoride to the selected 4-aminopyridine of from about 3:1 to about 30:1 may be used with the preferred range being 7.5:1 to 25:1. The amount of sodium nitrite utilized will generally be a molar ratio of sodium nitrite to selected 4-aminopyridine of from about 1:1 to about 1.5:1 and preferably from 1:1 to 1.25:1.

The concentration of the hydrogen fluoride which is used in the diazotization of 4-aminopyridines may generally vary from about 50% aqueous up to anhydrous hydrogen fluoride and preferably 90% aqueous up to anhydrous hydrogen fluoride.

The diazotization temperature may vary from about −20° C. to about 25° C. and preferably from −10° C. to about 10° C. and the reaction may generally be carried out under varying pressure conditions and more particularly at pressures from about 0.5 to about 50 atm. with the preferred range being about 0.8 to about 1.5 atm. The decomposition temperature will generally vary from about 15 to about 100° C. and preferably from 30 to 75° C.

Generally, the amount of stabilizer compound used to form the adduct of 4-fluoropyridine can vary widely with a slight stoichiometric excess being preferred. More particularly, a molar ratio of about 1:1 to about 5:1 of stabilizer compound to selected 4-aminopyridine may be used with the preferred range being about 1:1 to about 1.5:1.

The overall reaction time is generally not critical and will vary widely depending on the particular conditions. The decomposition time generally will vary from about 0.1 to about 25 hours and more particularly will be from about 0.5 to 5 hours.

The following example is further illustrative of this invention.

EXAMPLE I

To a two liter stainless steel reactor cooled at −10° C. is charged anhydrous hydrogen fluoride (400 g.; 20 moles). Then, 4-aminopyridine (94.1 g.; 1.0 mole) is added during a 0.5 hour period, followed by the addition of sodium nitrite (84.0 g.; 1.2 moles) at 0±5° C. during a 0.5 hour period.

4-pyridyldiazonium fluoride which is formed in the step noted above is then decomposed at 30–50° C. during a 1.5 hour period. During the decomposition, nitrogen saturated with hydrogen fluoride is vented through refrigerated condensers. The hydrogen fluoride refluxes back to the reaction vessel.

After the decomposition is complete (cessation of gas evolution), the reaction mixture is cooled to −10° C. and transferred to a cold (−10° C.) neutralization vessel containing 29% ammonium hydroxide (2 liters) and methylene chloride (1 liter) during a 0.75 hour period. (Final pH: 8.) The methylene chloride layer (lower) is separated, dried over silica gel, filtered and the filter cake washed with methylene chloride (0.25 liter).

Hydrogen chloride gas is passed into the methylene chloride solution of 4-fluoropyridine. Concentration of the reaction mixture at 30–50 mm. at ambient temperatures provided a yellow powder, wt. 72.0 g. (54% yield; 0.54 mole), M.P. 100° C. (with gas evolution).

Assay:

(a) H'NMR: conforms to predicted pattern expected for 4-fluoropyridine hydrochloride, with 7% impurity.
(b) Percent nitrogen:
  Found: 9.97%
  Calc. for $C_5H_5ClFN$: 10.48%
(c) Neutralization equivalent (for HCl salt):
  Found: 137.1
  Calc. for $C_5H_5ClFN$: 133.6
(d) Non-aqueous titration (for free 4-fluoropyridine) ($HClO_4$ titration with acetic acid-mercuric acetate): 93.8%

What is claimed is:

1. In a method for preparing a 4-fluoropyridine salt adduct which comprises diazotizing a 4-aminopyridine compound of the formula:

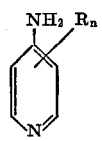

wherein each R is independently selected from the group consisting of alkyl of 1 to 4 carbon atoms; alkoxy of 1 to 4 carbon atoms; nitro and halogen and $n$ is an integer of 0 to 4 in the presence of hydrogen fluoride and sodium nitrite followed by decomposition to form a reaction mixture containing the corresponding 4-fluoropyridine, the improvement comprising:

(a) neutralizing the reaction mixture with base in the presence of an inert organic solvent and
(b) reacting the resulting mixture with a mineral acid selected from the group consisting of HCl, HBr, and $H_2SO_4$ to form the corresponding 4-fluoropyridine salt adduct.

2. The method of claim 1 wherein said neutralizing agent is selected from the group consisting of alkali and alkaline earth metal hydroxides, oxides and carbonates.

3. The method of claim 1 wherein said inert organic solvent is selected from the group consisting of aliphatic or cyclic hydrocarbons having up to 8 carbon atoms, aromatic hydrocarbons having up to 10 carbon atoms, halogenated derivatives of said hydrocarbons, and aliphatic ethers and alcohols having up to 8 carbon atoms.

4. The method of claim 1 wherein the organic solvent is dried with a drying agent following the neutralization step and prior to the reaction with mineral acid.

5. The method of claim 1 wherein said compound is 4-aminopyridine.

6. The method of claim 5 wherein HCl is said mineral acid.

7. The method of claim 6 wherein ammonium hydroxide is said base and methylene chloride is said inert organic solvent.

8. A method for providing 4-fluoropyridine or substituted 4-fluoropyridine having the formula:

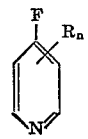

wherein each R is independently selected from the group consisting of alkyl of 1 to 4 carbon atoms; alkoxy of 1 to 4 carbon atoms; nitro and halogen and $n$ is an integer of 0 to 4 which comprises:
  (a) preparing the salt adduct by the method of claim 1,
  (b) neutralizing said salt adduct in a mixture containing a base and an inert organic solvent, and
  (c) separating the organic layer from the reaction mixture and drying over a drying agent to provide the respective 4-fluoropyridine compound in an organic medium.

9. The method of claim 8 wherein said salt adduct is that formed using HCl.

References Cited

Wibaut et al.: Bull. Soc. Chim., France, pp. 424–8 (1958).

HARRY I. MOATZ, Primary Examiner

U.S. Cl. X.R.

424—263; 260—297 R